United States Patent [19]

Camberlin et al.

[11] Patent Number: 5,086,154
[45] Date of Patent: Feb. 4, 1992

[54] LINEAR AROMATIC POLY(AMIDEIMIDE)S HAVING LATENT MALEIMIDE ENDGROUPS

[75] Inventors: Yves Camberlin, Caluire; Philippe Michaud, Lyons, both of France

[73] Assignee: Rhone-Poulenc Chimie, Courbevoie, France

[21] Appl. No.: 550,047

[22] Filed: Jul. 9, 1990

[30] Foreign Application Priority Data

Jul. 11, 1989 [FR] France .................. 89 09669

[51] Int. Cl.$^5$ .............................................. C08G 18/28
[52] U.S. Cl. ...................................... 528/73; 548/434; 548/452
[58] Field of Search .................. 528/73; 548/434, 452

[56] References Cited

U.S. PATENT DOCUMENTS 4,342,860 8/1982 Locatelli et al. .................. 528/73

FOREIGN PATENT DOCUMENTS 2166209 10/1973 France .

OTHER PUBLICATIONS

Patent Abstracts of Japan, vol. 8, No. 114, (C-225) [1551], 26 May 1984; & JP-A-59 27 921 (Hitachi) 14-02-1984.

Primary Examiner—Maurice J. Welsh
Assistant Examiner—Rachel Johnson
Attorney, Agent, or Firm—Burns, Doane, Swecker & Mathis

[57] ABSTRACT

Linear aromatic poly(amideimide)s having latent maleimide endgroups, readily converted to maleimido polymers that can be crosslinked/shaped into useful molded articles, are prepared by directly copolymerizing an aromatic diisocyanate (i) with a tricarboxylic acid monoanhydride (ii) and a monocarboxylic acid (iii) containing a blocked maleimide functional group.

8 Claims, No Drawings

LINEAR AROMATIC POLY(AMIDEIMIDE)S HAVING LATENT MALEIMIDE ENDGROUPS

BACKGROUND OF THE INVENTION

1. Field of the Invention

The present invention relates to novel straight-chain aromatic poly(amideimide)s in which the polymer chains have functional endgroups, each comprising a latent maleimide function.

This invention also relates to a process for the preparation of such novel poly(amideimide)s having functional endgroups, and to the production of crosslinked polymers therefrom.

As utilized herein, by the expression functional endgroup comprising "a latent maleimide function" is intended a radical containing a blocked maleimide function which, under the conditions existing at the beginning of subsequent conversion of the poly(amideimide)s of the invention, under the influence of heat, is converted into a free maleimide function of the formula:

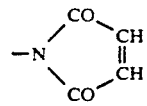

(reaction designated "thermal deblocking of maleimide functions").

2. Description of the Prior Art

Poly(amideimide)s having functional endgroups comprising a latent maleimide function, such as a nadimido (or 3,6-endomethylene-1,2,3,6-tetrahydrophthalimido) residue, are described in Japanese Application JA-A-50/089,499, which poly(amideimide)s are prepared by the following reaction sequence: a polycondensation reaction in solution between, in particular, a monoanhydride of a tricarboxylic acid and an excess of an aromatic diprimary diamine, followed by a condensation reaction of nadic acid (or 3,6-endomethylene-1,2,3,6-tetrahydrophthalic acid) with the NH₂ endgroups of the oligomers formed upon completion of the polycondensation reaction.

However, the actual carrying out of such a process presents several disadvantages. One of these disadvantages, which is common to the majority of processes in which a reactive amine is reacted with a carbonyl-containing organic compound, such as an anhydride of a carboxylic acid, is in the necessity for conducting a cyclizing dehydration of the poly(amideacid)s formed as intermediates; as this reaction is an equilibrium reaction, it is necessary to remove the water liberated and this cyclizing operation generally cannot be carried out completely in solution.

Another disadvantage, which results from the impossibility of, or at least the great difficulty in, obtaining a complete cyclization of the poly(amideacid)s formed as intermediates, is in the development of secondary reactions, in which the non-cyclized poly(amideacid)s interfere, which are responsible for imperfectly providing functional endgroups on the poly(amideimide) chains which contain a nadimido residue and for an increase in the molecular weights. The result is great difficulty, if not impossibility, in being able to use these polymers (after thermal deblocking of the maleimide functions), at temperatures equal to or below 300° C. and at pressures equal to or below 10 MPa, to produce, for example, suitable shaped articles by compression molding.

SUMMARY OF THE INVENTION

Accordingly, a major object of the present invention is the provision of novel poly(amideimide)s having functional endgroups comprising a latent maleimide function which avoid those disadvantages and drawbacks to date characterizing the state of this art in respect of the actual preparation thereof or in respect of their subsequent conversion.

Briefly, the present invention features novel straight-chain aromatic poly(amideimide)s having functional endgroups comprising a latent maleimide function, said novel poly(amideimide)s being the copolymerizates of the following reactants (i), (ii) and (iii) when simultaneously reacted at a temperature ranging from 50° C. to 200° C. and in the presence of an organic solvent or a mixture of organic solvents:

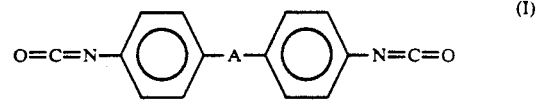

in which the symbol A is a single valence bond or one of the groups:

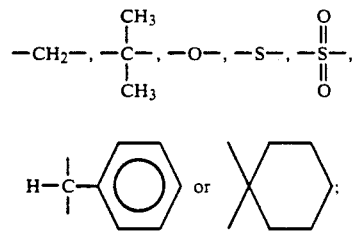

(ii) a monoanhydride of a tricarboxylic acid of the formula:

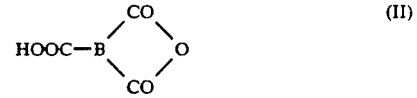

in which the symbol B is a substituted or unsubstituted trivalent aromatic radical having at least 6 carbon atoms, or two such radicals bonded together by a single valence bond or one of the groups:

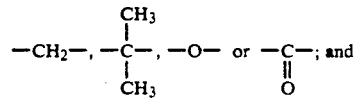

(iii) a carboxylic monoacid which comprises a latent maleimide function, of the formula:

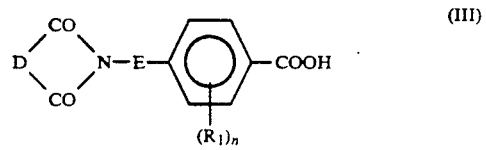

in which the symbol $R_1$ is a methyl radical; n is an integer equal to 0, 1, 2 or 3; the symbol E is a single valence bond or a group —$CH_2$— and is in the ortho-, meta- or para-position relative to the carbon atom of the benzene ring bonded to the group COOH; and the symbol D is one of the divalent radicals:

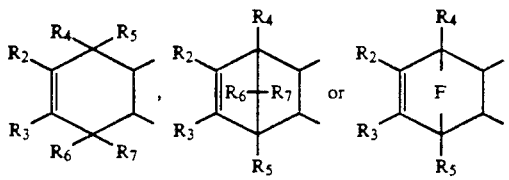

wherein the symbols $R_2$, $R_3$, $R_4$, $R_5$, $R_6$ and $R_7$, which may be identical or different, are each a hydrogen atom or a straight or branched chain alkyl radical having from 1 to 4 carbon atoms and the symbol F is an oxygen or sulfur atom; with the proviso that the respective proportions of the comonomers (i) and (ii) are such that the ratio r:

$$\frac{\text{number of moles of diisocyanate (i)}}{\text{number of moles of anhydride (ii)}}$$

ranges from 1.05/1 to 2.1; and the proportion of the comonomer (iii) is such that the radio r':

$$\frac{\text{number of moles of carboxylic acid (iii)}}{\text{number of moles of diisocyanate (i)} - \text{number of moles of anhydride (ii)}}$$

is equal to 2.

DETAILED DESCRIPTION OF THE PREFERRED EMBODIMENTS OF THE INVENTION

More particularly according to the present invention, it will be appreciated that the expression "functional endgroup comprising a latent maleimide function" refers to a radical of the formula:

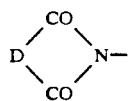 (IV)

in which D is as defined above.

Specific examples of the diisocyanate (i) of formula (I) which are very particularly suitable are:
4,4'-Diisocyanato-2,2-diphenylpropane;
4,4'-Diisocyanatodiphenylmethane;
4,4'-Diisocyanatobiphenyl;
4,4'-Diisocyanatodiphenyl sulfide;
4,4'-Diisocyanatodiphenyl sulfone;
4,4'-Diisocyanatodiphenyl ether;
4,4'-Diisocyanato-1,1-diphenylcyclohexane.

4,4'-Diisocyanatodiphenylmethane and 4,4'-diisocyanatodiphenyl ether are the preferred diisocyanates according to the present invention.

Specific examples of the monoanhydrides of tricarboxylic acids (ii) of formula (II) which are very particularly suitable are:
Trimellitic acid monoanhydride;
Naphthalene-2,3,6-tricarboxylic acid 2,3-monoanhydride;
Naphthalene-1,8,4-tricarboxylic acid 1,8-monoanhydride;
Naphthalene-1,2,5-tricarboxylic acid 1,2-monoanhydride;
Diphenyl-3,4,4'-tricarboxylic acid 3,4-monoanhydride;
Diphenyl sulfone-3,4,3'-tricarboxylic acid 3,4-monoanhydride;
Diphenyl ether-3,4,4'-tricarboxylic acid 3,4-monoanhydride;
Benzophenone-3,4,4'-tricarboxylic acid 3,4-monoanhydride;
Diphenylisopropylene-3,4,3'-tricarboxylic acid 3,4-monoanhydride.

Trimellitic acid monoanhydride is the preferred monoanhydride according to the present invention.

Specific examples of the carboxylic monoacids (iii) of formula (III) which are very particularly suitable are:
2-(1,3,3,6-Tetrahydrophthalimido)benzoic acid;
3-(1,2,3,6-Tetrahydrophthalimido)benzoic acid;
4-(1,2,3,6-Tetrahydrophthalimido)benzoic acid;
2-Nadimidobenzoic acid or 2-(3,6-endomethylene-1,2,3,6-tetrahydrophthalimido)benzoic acid;
3-Nadimidobenzoic acid;
4-Nadimidobenzoic acid;
2-(α-Methylnadimido)benzoic acid or 2-(4-methyl-3,6-endomethylene-1,2,3,6-tetrahydrophthalimido)benzoic acid;
3-(α-Methylnadimido)benzoic acid;
4-(α-Methylnadimido)benzoic acid;
2-(3,6-Endo-oxy-1,2,3,6-tetrahydrophthalimido)benzoic acid;
3-(3,6-Endo-oxy-1,2,3,6-tetrahydrophthalimido)benzoic acid;
4-(3,6-Endo-oxy-1,2,3,6-tetrahydrophthalimido)benzoic acid.

4-Nadimidobenzoic acid and 4-(α-methylnadimido)benzoic acid are the preferred monocarboxylic acids according to the present invention.

The carboxylic monoacids (iii) are compounds which are essentially known to this art [cf., in particular, *Chemical Abstracts:* 75, 35463d (1971); 82, 133.114e (1975); 92, 146.595u (1980); and 102, 148.446v (1985)]. They can be prepared, in particular, by reacting an aminocarboxylic acid of the formula:

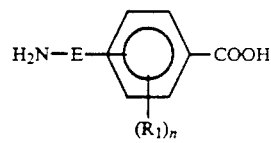 (V)

in which the symbols $R_1$, D and E are as defined above in formula (III), in solution, with the anhydride of the formula:

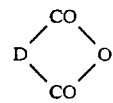 (VI)

in which the symbol D is as defined above in formula (III), in the presence of acetic anhydride and, for example, triethylamine and a nickel salt.

The reaction to prepare the poly(amideimide)s according to the present invention is carried out in a homogeneous medium by adding to the reactants (i), (ii) and (iii) a solvent or a mixture of solvents common to the reactants and to the product formed. The solvents which are very suitable are the polar solvents, in particular N,N-dimethylacetamide, N,N-dimethylformamide, N-methyl-2-pyrrolidone, dimethyl sulfoxide, 1,1,3,3-tetramethylurea, 1,3-dimethylurea and a mixture of these solvents; they must, moreover, be perfectly anhydrous.

Preferably, the proportions of the reactants or comonomers (i) and (ii) are such that the ratio r:

$$r = \frac{\text{number of moles of diisocyanate (i)}}{\text{number of moles of anhydride (ii)}}$$

ranges from 1.1/1 to 1.5/1.

The polymerization reaction is carried out at a temperature ranging from 50° C. to 200° C.; best results are obtained at temperatures ranging from 80° C. to 190° C.

In practice, the starting reactants, which are employed together, are dissolved in the solvent or solvents, preferably at ambient temperature (on the order of 20° C. to 30° C.), and the temperature of the solution obtained is then increased to the desired reaction temperature ranging from 50° C. to 200° C. and preferably from 80° C. to 190° C., either directly or progressively, typically operating under atmospheric pressure for a period of time which will vary to a large degree as a function of the precise temperature conditions adopted. Very preferably, the operating procedure entails bringing the reaction solution to a temperature ranging from 80° C. to 110° C. at the beginning of the reaction and then in increasing the temperature over the course of the reaction, from 80° C. to 110° C. at the start of the reaction up to 160° to 190° C., following a program of an increase in temperature on the order of +50° C. to +110° C. at the end of a unit time varying from 1 hour to 3 hours; once the desired maximum temperature (ranging from 160° C. to 190° C.) has been reached, an additional heating stage is carried out at this temperature for a period of time ranging from 2 hours to 4 hours.

The reaction to prepare the poly(amideimide)s of this invention, if need be, can be carried out in the presence of a suitable catalyst. The catalysts which can be used, if necessary, are organic compounds which do not contain functional groups having a mobile hydrogen capable of reacting with the isocyanate groups. Compounds which are very suitable from this standpoint are, in particular, the tertiary amines of the family of mono- or polycyclic compounds having at least one intra- and/or extra-cyclic tertiary nitrogen atom; specific examples of such catalysts which can be used are, in particular: 1,4-diazobicyclo[2.2.2]octane, and the N,N'-dialkylpiperazines, N-alkylmorpholine and N-alkylpiperidine, in which the alkyl radical is a methyl and/or ethyl radical. It is also possible to use the metal salts as catalysts; specific examples of such catalysts are, in particular, dibutyltin dilaurate and cobalt acetylacetonate.

The amount of catalyst, when indeed used, typically ranges from 0.1% to 2% of the total weight of the reactants (i), (ii) and (iii) dissolved.

Upon completion of the reaction, the poly(amideimide) is obtained in the form of a solution. It is precipitated by adding a non-solvent or a mixture of non-solvents to the reaction mixture and the precipitated polymer is separated from the reaction mixture. Suitable non-solvents are, for example, water, acetone, tetrahydrofuran, toluene or any other solvent which does not solubilize the desired polymer. It is also possible to recover the polymer by evaporation of the solvent or solvents from the reaction mixture in a ventilated oven. Once it has been separated off and dried, the polymer obtained is in the form of a powder which can be subjected to subsequent grinding and screening operations.

The thermal deblocking of the maleimide functions can be easily accomplished by simple heating of the polymer in powder form at a temperature ranging from 200° C. to 300° C., and preferably from 220° C. to 280° C., for a period of time which will vary as a function of the precise temperature conditions adopted. It typically ranges from 30 minutes to 2 hours. During this heat treatment the conversion takes place, at the ends of the polymer chains of the poly(amideimide), namely, a conversion of the endgroups Y, each comprising a latent maleimide function, of the formula:

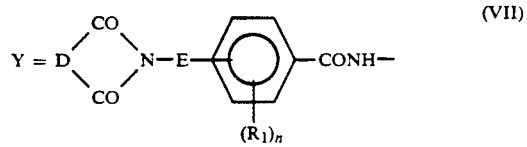

in which the symbols $R_1$, n, E and D are as defined above with respect to formula (III), into the endgroups Z, each comprising a free maleimide function, of the formula:

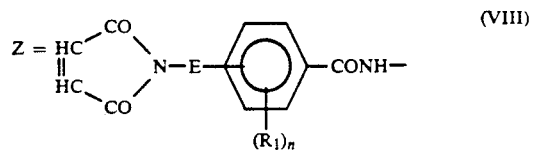

in which the symbols $R_1$, n, E and D are also as defined above in formula (III).

With regard to the structure of the straight chain of the poly(amideimide), this essentially has the following formula:

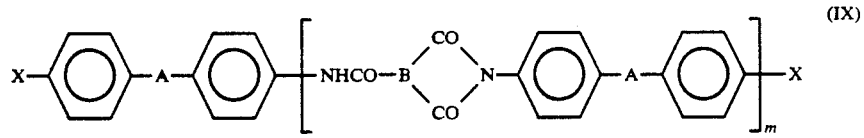

in which the symbols A and B are as defined above with respect to formulae (I) and (II); the symbol m represents a number which is at least equal to 1 and preferably ranges from 1 to 10; X = Y before thermal deblocking of the maleimide functions and X = Z after the said deblocking has been effected.

The poly(amideimide)s obtained after the thermal deblocking of the maleimide functions can advantageously be used for the production of suitable shaped article by compression molding techniques with temperature conditions which are equal to or less than 300° C. and pressure conditions which are equal to or less than 10 MPa.

One advantage of the poly(amideimide)s obtained after thermal deblocking of the maleimide functions is that, because to their highly reactive endgroups of the maleimido type, they can be converted, at any time in their shaping (preferably after shaping), into crosslinked polymers which have excellent mechanical and electrical properties and are highly chemically inert at temperatures of 200° C. to 300° C. This crosslinking is carried out by simple heating at a temperature ranging from 150° C. to 300° C. for a given period of time, if appropriate in the presence of a free radical polymerization initiator or of an anionic polymerization catalyst.

The poly(amideimide)s obtained after thermal deblocking of the maleimide functions can also be employed in copolymerization reactions with one or more other compounds having functional groups capable of reacting with the reactive double bonds of the maleimido endgroups.

In order to further illustrate the present invention and the advantages thereof, the following specific examples are given, it being understood that same are intended only as illustrative and in nowise limitative.

EXAMPLE 1

The following materials were introduced successively at ambient temperature into a 250 cm³ glass reactor fitted with a central stirrer of the anchor type, an ascending condenser and a system for heating with the aid of a suitable oil bath, in which reactor a slight excess pressure of dry nitrogen was established:

(a) 19.2 g (0.1 mole) of trimellitic acid monoanhydride;
(b) 30.0 g (0.12 mole) of 4,4'-diisocyanatodiphenylmethane;
(c) 11.9 g (0.04 mole) of 4-(α-methylnadimido)-benzoic acid; and
(d) 189 g of N-methyl-2-pyrrolidone.

The reaction mixture was stirred for a few minutes at ambient temperature (23° C.) and it was then heated at 100° C. Stirring was continued, following the temperature increase regime indicated below:

2 hours, 30 minutes, at 100° C., followed by heating from 100° C. to 180° C.; and
3 hours at 180° C.

The collodion or solution of poly(amideimide) thus obtained was a liquid mass dark red in color having a weight of 240 g (it contained 51 g of polymer). No unreacted NCO functions were detected by infrared analysis.

The poly(amideimide) was precipitated by adding water to the solution in which it was dissolved. To this end, 50 g of such solution were introduced progressively, with stirring, into 500 cc of water. The precipitate obtained was filtered off and washed with water and it was then dried at 100° C. for 24 hours under a vacuum of 53.2 × 10² Pa. The powder obtained was then finely ground and screened to retain particles smaller than 200 μm.

The poly(amideimide) powder having a particle size of less than 200 μm which was obtained was then heated at 250° C. for 1 hour.

During this heat treatment methylcyclopentadiene was liberated and, at the same time, at the ends of the polymer chains of the poly(amideimide): the endgroups $Y_1$, each containing an α-methylnadimido residue, of the formula:

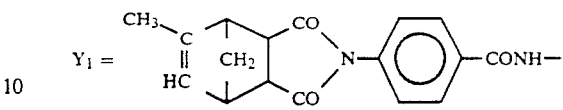

were converted into endgroups $Z_1$, each containing a free maleimide function, of the formula:

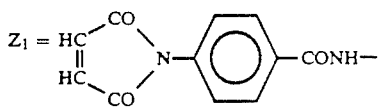

The formation of the free maleimide functions was monitored by infrared analysis and by measurements of the loss in weight by thermogravimetry and it was found that the above-mentioned conversion was quite complete upon completion of the heat treatment (1 hour at 250° C.).

With regard to the structure of the straight chain or backbone of the poly(amideimide), this essentially had the following formula:

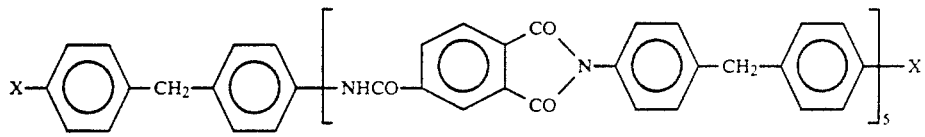

in which, before thermal deblocking of the maleimide functions, $X = Y_1$ and, after such deblocking, $X = Z_1$.

The powder obtained after carrying out the thermal deblocking of the maleimide functions was introduced, in an amount of 7.5 g, into a cylindrical mold (diameter: 5 cm) and the entire assembly was placed between the two circular plates of a press (these plates were adapted to the size of the mold and preheated to 300° C.), on which a pressure of 1.47 MPa was applied. When the temperature of the material reached 250° C., a pressure of 4.41 MPa was applied. When thermal equilibrium was reached, namely, when the temperature of the material was at 300° C., the entire assembly was maintained under these conditions for an additional 1 hour. The mold and its contents were then permitted to cool for 12 hours under a pressure of 1 MPa. After release from the mold, a cylindrical molded object (diameter: 5 cm; height: 3 mm) was obtained which was placed in an oven preheated to 250° C. for 16 hours. At the end of this time, the molded shaped article had the following bending mechanical characteristics (measured in accordance with the standard ASTM D 790 M; distance 35 mm):

Bending strength: 140 MPa,
Bending modulus: 3,500 MPa.

The glass transition temperature of the polymer from which the molded article was shaped, determined by TMA (Thermal Mechanical Analysis; standard: ASTM E 831-81 with a rate of increase in temperature of 5° C./min) measurements was 280° C.

The molded shaped article was subjected to heat aging for 3,000 hours at 290° C.: at the end of this time it showed no apparent degradation, cracking or blistering.

Description of the process for the preparation of 4-(α-methylnadimido)benzoic acid:

The following materials were introduced simultaneously over the course of 10 minutes into a stirred reactor fitted with an ascending condenser and preheated to 60° C. with the aid of a suitable oil bath:

(a) 68.5 g (0.500 mole) of 4-aminobenzoic acid in solution in 300 cc of acetone; and (b) 97.9 g (0.550 mole) of α-methylnadic anhydride or 4-methyl-3,6-endomethylene-1,2,3,6-tetrahydrophthalic anhydride.

The mixture was permitted to react for 20 minutes, with stirring. At the end of this time, the following were introduced successively:

(c) 16.7 g (0.165 mole) of triethylamine;

(d) 0.55 g of nickel acetate; and (e) 61.2 g (0.600 mole) of acetic anhydride.

The mixture was permitted to react at 60° C. for 3 hours, 15 minutes, with stirring. At the end of this time, the mixture was cooled to 20° C., which caused the formation of a beige precipitate. The product was precipitated completely by adding 500 cc of ice-water.

After filtering off, the product obtained was purified by treatment with 300 cc of toluene in the reactor described above, preheated to 110° C.: the mixture was stirred for 1 hour and at the end of this time was cooled to 20° C. and the white product obtained was filtered off. After drying at 100° C., under $53 \times 10^2$ Pa for 12 hours, 84.7 g of a white product were obtained which had a melting point of 220° C. measured by differential thermal analysis and had a structure conforming to that of 4-(α-methylnadimido)benzoic acid according to the proton NMR analyses carried out.

EXAMPLE 2

The procedure was as indicated above in Example 1, but starting with the following charges:

(a) 55 g 0.22 mole) of 4,4'-diisocyanatodiphenylmethane;

(b) 38.4 g (0.20 mole) of trimellitic acid monoanhydride;

(c) 11.9 g (0.04 mole) of 4-(α-methylnadimido)benzoic acid; and (d) 246 g of N-methyl-2-pyrrolidone.

The mixture was permitted to react for 5 hours, 30 minutes, with stirring, following the temperature increase regime indicated in Example 1.

The collodion or solution of poly(amideimide) thus obtained was a liquid mass of dark red color having a weight of 332 g (it contained 86 g of polymer). No anhydride or NCO functions were detected in the collodion by infrared analysis.

The precipitation of the collodion in water and the washing and drying of the precipitate formed were identical to the operations described in Example 1. A beige powder was obtained which was then finely ground and screened to provide particles smaller than 200 μm.

Thermal deblocking of the maleimide functions was then carried out, followed by the molding operation, using the methods described in Example 1 in this case also. In this second example, the cylindrical molded shaped article obtained was subjected to heating in an oven preheated to 250° C. for 48 hours (instead of 16 hours in Example 1): the glass transition temperature of the polymer from which the molded article was shaped was found to be 280° C.

While the invention has been descried in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims, including equivalents thereof.

What is claimed is:

1. A straight-chain aromatic poly(amideimide) having latent maleimide endgroups, comprising the copolymerizate of the following reactants (i), (ii) and (iii):

(i) a diisocyanate of the formula:

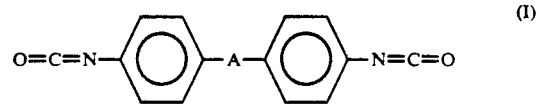

in which the symbol A is a single valence bond or one of the groups:

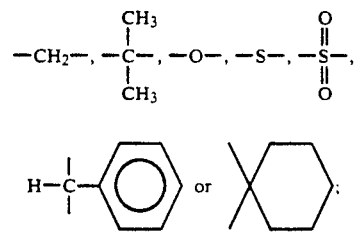

(ii) a monoanhydride of a tricarboxylic acid of the formula:

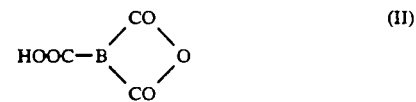

in which the symbol B is a substituted or unsubstituted trivalent aromatic radical having at least 6 carbon atoms, or two such radicals bonded together by a single valence bond or one of the groups:

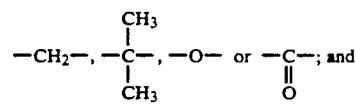

(iii) a carboxylic monoacid which comprises a latent maleimide function, of the formula:

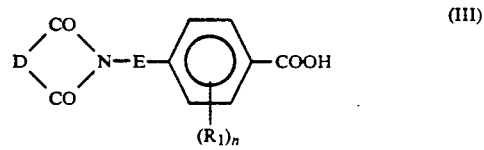

in which the symbol $R_1$ is a methyl radical; n is an integer equal to 0, 1, 2 or 3; the symbol E is a single valence bond or a group —CH$_2$—and is in the ortho-, meta- or para-position relative to the carbon atom of the benzene ring bonded to the group COOH; and the symbol D is one of the divalent radicals:

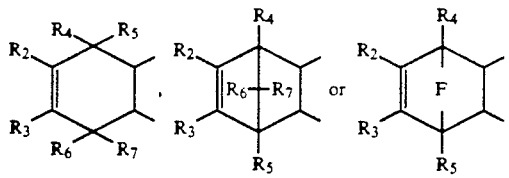

wherein the symbols R$_2$, R$_3$, R$_4$, R$_5$, R$_6$ and R$_7$, which may be identical or different, are each a hydrogen atom or a straight or branched chain alkyl radical having from 1 from 4 carbon atoms and the symbol F is an oxygen or sulfur atom; with the proviso that the respective proportions of the comonomers (i) and (ii) are such that the ratio r:

$$\frac{\text{number of moles of diisocyanate (i)}}{\text{number of moles of anhydride (ii)}}$$

ranges from 1.05/1 to 2.1; and the proportion of the comonomer (iii) is such that the ratio r':

$$\frac{\text{number of moles of carboxylic acid (iii)}}{\text{number of moles of diisocyanate (i)} - \text{number of moles of anhydride (ii)}}$$

is equal to 2.

2. The aromatic poly(amideimide) as defined by claim 1, said diisocyanate (i) of formula (I) comprising 4,4'-diisocyanato-2,2-diphenylpropane; 4,4'-diisocyanatodiphenylmethane; 4,4'-diisocyanatobiphenyl; 4,4'-diisocyanatodiphenyl sulfide; 4,4'-diisocyanatodiphenyl sulfone; 4,4'-diisocyanatodiphenyl ether; or 4,4'-diisocyanato-1,1-diphenylcyclohexane.

3. The aromatic poly(amideimide) as defined by claim 1, said monoanhydride of a tricarboxylic acid (ii) of formula (II) comprising trimellitic acid monoanhydride; naphthalene-2,3,6-tricarboxylic acid 2,3-monoanhydride; naphthalene-1,8,4-tricarboxylic acid, 1,8-monoanhydride; naphthalene-1,2,5-tricarboxylic acid 1,2-monoanhydride; diphenyl-3,4,4'-tricarboxylic acid 3,4-monoanhydride; diphenyl sulfone-3,4,3'-tricarboxylic acid 3,4-monoanhydride; diphenyl ether-3,4,4'-tricarboxylic acid 3,4-monoanhydride; benzophenone-3,4,4'-tricarboxylic acid 3,4-monoanhydride; or diphenylisopropylene-3,4,3'-tricarboxylic acid 3,4-monoanhydride.

4. The aromatic poly(amideimide) as defined by claim 1, said carboxylic monoacid (iii) containing a latent maleimide function, of formula (III), comprising 2-(1,2,3,6-tetrahydrophthalimido)benzoic acid; 3-(1,2,3,6-tetrahydrophthalimido)benozic acid; 4-(1,2,3,6-tetrahydrophthalimido)-benzoic acid; 2-nadimidobenzoic acid or 2-(3,6-endomethylene-1,2,3,6-tetrahydrophthalimido)benzoic acid; 3-nadimidobenzoic acid; 4-nadimidobenzoic acid; 2-($\alpha$-methylnadimido)benzoic acid or 2-(4-methyl-3,6-endomethylene-1,2,3,6-tetrahydrophthalimido)benzoic acid; 3-($\alpha$-methylnadimido)-benzoic acid; 4-($\alpha$-methylnadimido)benzoic acid; 2-(3,6-endo-oxy-1,2,3,6-tetrahydrophthalimido)benzoic acid; 3-(3,6-endo-oxy-1,2,3,6-tetrahydrophthalimido)benzoic acid; or 4-(3,6-endo-oxy-1,2,3,6-tetrahydrophthalimido)benzoic acid.

5. A process for the preparation of the aromatic poly(amideimide) as defined by claim 1, comprising dissolving the comonomers (i), (ii) and (iii) in at least one organic solvent, at ambient temperature, and then increasing the temperature of the resulting solution to a value ranging from 50° C. to 200° C.

6. The process as defined by claim 5, said at least one organic solvent comprising N,N-dimethylacetamide, N,N-dimethylformamide, N-methyl-2-pyrrolidone, dimethyl sulfoxide, 1,1,3,3-tetramethylurea or 1,3-dimethylurea.

7. The process as defined by claim 5, comprising increasing the temperature of the resulting solution to a value ranging from 80° C. to 190° C.

8. A straight-chain aromatic poly(amideimide) having the structural formula:

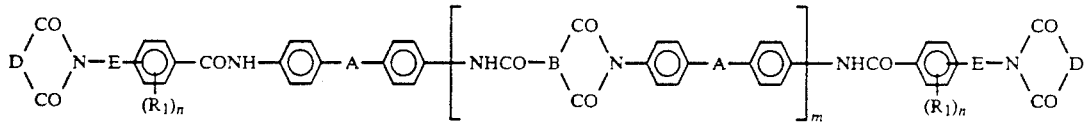

wherein D, E, R$_1$, n and A are as defined in claim 1 and m is at least 1.